United States Patent Office 3,254,096
Patented May 31, 1966

3,254,096
DERIVATIVES OF BISCARBORANE
John A. Dupont and Marion F. Hawthorne, Huntsville, Ala., assignors to Rohm & Haas Company, Philadelphia, Pa., a corporation of Delaware
No Drawing. Filed Mar. 24, 1961, Ser. No. 98,264
7 Claims. (Cl. 260—348)

This invention concerns derivatives of biscarborane.

The field of boron chemistry, particularly the chemistry of the higher boron hydrides, such as decaborane, is so new that the nomenclature for many of the compounds has not yet been definitely fixed. However, chemists working in this field have agreed that the product formed by the reaction of at least two moles of a decaborane adduct of the formula $B_{10}H_{12} \cdot X_2$ and diacetylene is biscarborane with the formula $$HC_2B_{10}H_{10}C_2B_{10}H_{10}H$$

or, as commonly written, $$H—\ominus—\ominus—H$$

in which the symbol $—\ominus—$ represents $—C_2B_{10}H_{10}—$. This nomenclature will be used throughout the specification and the claims. Thus, the biscarboranyl radical is represented by the formula $$—\ominus—\ominus—H$$

The compounds of the present invention are useful as high energy components of propellant compositions, either as such, or when further reacted to introduce polymerizable groups into the molecule. The use of typical compounds in propellants is set forth in detail hereinafter.

The compounds of the present invention are of the general formula $$R—\ominus—\ominus—R$$

in which R is halogen, lower alkyl and carbethoxy, and in which the R's are the same in any one product, and $—\ominus—$ is as set forth hereinbefore, and $H—\ominus—\ominus—R^1$ in which $R^1$ is $CH_2=CH—CH_2—$, $—CH_2OH$, and

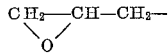

in which $—\ominus—$ is as set forth hereinbefore.

Biscarborane, $H—\ominus—\ominus—H$, can be prepared by the reaction of at least two moles of a decaborane adduct of the formula $B_{10}H_{12} \cdot X_2$, with diacetylene. Presumably, carboranylacetylene, $H—\ominus—C\equiv CH$, is the product formed as the intermediate and then reacts with an additional mole of $B_{10}H_{12} \cdot X_2$ to produce biscarborane.

The preparation of biscarborane is the subject of a cofiled application, Serial No. 98,263, filed on even date herewith.

The preparation of the derivatives of biscarborane of the formulas $$R—\ominus—\ominus—R$$

in which R is halogen, lower alkyl and carbethoxy and in which the R's are the same in any one compound and $$H—\ominus—\ominus—R^1$$

in which $R^1$ is $CH_2=CH—CH_2—$, $—CH_2OH$, and

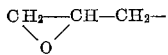

in which $—\ominus—$ is as set forth hereinbefore, are prepared by employing the dianion, $—\ominus—\ominus—$, and this can be most readily prepared by reacting biscarborane with an $R^2Li$ compound in which $R^2$ can be an alkyl or aryl radical to give $Li—\ominus—\ominus—Li$. Typical of such radicals are methyl, ethyl, butyl, phenyl and tolyl, with butyllithium being preferred since it is commercially available in solution in an aliphatic hydrocarbon, such as pentane or hexane, and does not yield undesirable contaminants. The reaction of $R^2Li$ with biscarborane is similar to the well-known Grignard reaction and the products produced react very similarly and have similar properties. Thus, as in the case of the Grignard reaction, it is necessary or preferred to carry out the reaction of biscarborane with the $R^2Li$ compound in the presence of an ether, the most commonly used being diethyl ether. Tetrahydrofurfuran can also be used. The ether need not be the sole solvent and the reaction can be effected using the pentane or hexane solutions of butyllithium described hereinbefore by adding ether to the reaction mixture. Anhydrous solutions of $Li—\ominus—\ominus—Li$ are stable at room temperature for prolonged periods when stored under an inert atmosphere, such as nitrogen.

A less preferred method of preparing the dianion of biscarborane comprises forming the di-Grignard compound $XMg—\ominus—\ominus—MgX$ in which X is halogen and preferably bromine or iodine. The di-Grignard compounds are prepared by the reaction of biscarborane, preferably in solution in an ether such as diethyl ether or tetrahydrofurfuran, with compounds RMgX in which R is lower alkyl, preferably methyl or ethyl, and X is halogen, preferably bromine or iodine. These Grignard groups exhibit typical reactivity, for instance, readily being replaced by halogen such as iodine to give the diiodobiscarborane as shown in Example III.

The derivatives of biscarborane described hereinbefore are prepared by the reaction of $Li—\ominus—\ominus—Li$ with a variety of reagents. The reaction conditions are in all cases substantially the same, and all are conducted under anhydrous condition in an inert atmosphere, such as nitrogen, argon or helium. The reaction temperature is from about 0° C. to about 25° C. and the addition rate of the reagent to the di-anion solution is not critical, depending only on control of the temperature. Since any excess reagents (other than the di-anion) can be readily removed from the reaction mixture, an excess is generally employed to increase the product yield. A one mole excess over theoretical is generally employed to increase the product yield. A one mole excess over theoretical is generally preferred.

Under the conditions set forth hereinbefore the dilithium compound $Li—\ominus—\ominus—Li$ can be reacted with halogens to form the dihalogen derivatives, alkyl halides to form the dialkyl derivatives, ethylene oxide to form the bis(2-hydroxyethyl) derivatives, allyl bromide to form the allyl derivatives and ethyl formate to form the diethyl dicarboxylate. The allyl derivatives can be epoxidized to give the methyl oxirane derivatives. The diethyl dicarboxylate can be reduced with lithium aluminum hydride to yield biscarboranyl methanol.

As set forth hereinbefore, biscarborane derivatives are valuable as components of propellant compositions. A typical formulation is as follows:

| Component: | Percent by weight |
|---|---|
| Ammonium perchlorate | 60.0 |
| Dimethyl biscarborane | 15.0 |
| Carboranylmethyl acrylate | 12.5 |
| TEGDN * | 12.5 |
| Benzoyl peroxide | 1.0 |

* TEGDN is triethylene glycol dinitrate.

This composition was cast into motor casings and cured at 80° C. for ten hours. Physical properties of the "grain" and the bonding to the motor casing were satisfactory.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

Example I

*Preparation of carboranylacetylene.*—To a well-stirred, refluxing suspension of 375 grams (1.87 moles) of bis(acetonitrile) decaborane, in 1.5 liters of dry acetonitrile, was added under nitrogen, a solution of 94.4 grams (1.89 moles) of diacetylene in 300 ml. of acetonitrile. The addition was carried out over a forty-five minute period after which the solution was refluxed for approximately four hours (the reaction solution was refluxed for approximately four hours (the reaction solution was refluxed one hour after becoming homogeneous)). The solution was stripped to a syrup using a rotary evaporator, treated with 500 cc. of 10% sodium hydroxide and extracted three times with 500–700 ml. portions of pentane. The combined pentane extracts were dried over anhydrous magnesium sulfate and concentrated to about one-half their original volume. This slightly yellow pentane solution was passed through a bed of basic alumina and the resulting colorless solution was concentrated to 200 ml. The white solid (biscarborane, 12 grams) which appeared was filtered off and washed with a small amount of pentane. The filtrate was evaporated to dryness yielding 110 grams (35%) of carboranylacetylene, a waxy white solid of M.P. 63–70° C. Repeated recrystallization from pentane at −80° C. afforded a material of M.P. 75–78° C.

*Analysis.*—Calculated for $B_{10}H_{12}C_4$: B, 64.27; C, 28.54; H, 7.20. Found: B, 62.22; C, 28.70; H, 7.70.

This example is included only to show that some biscarborane is produced in the process for the preparation of carboranylacetylene. The yield of biscarborane using this process can be increased by the use of additional BAND, but, as set forth hereinbefore, this is not the preferred process.

Example II

*Preparation of biscarborane.*—A solution of 84.0 grams (0.5 mole) of crude carboranylacetylene (M.P. 63–70° C.) in 500 ml. of dry acetonitrile and 101.0 grams (0.5 mole) of bisacetonitrile decaborane were refluxed overnight (approximately sixteen hours) under an atmosphere of nitrogen. The solution was allowed to cool to room temperature and the resulting crystalline solid was filtered. This solid was treated with 1.5 liters of benzene and filtered. The undissolved solid (BAND) amounted to 14.3 grams. The benzene filtrate was passed through a bed of basic alumina and evaporated to dryness yielding 65 grams of a crystalline white solid.

The reaction solution-filtrate was evapoarted down to a volume of 100 ml. and filtered. The solid obtained was washed with a small amount of acetonitrile and amounted to 9.5 grams (BAND). The resulting filtrate was concentrated to a syrup, dissolved in benzene, and refluxed with 125 ml. of concentrated hydrochloric acid and 400 ml. of water for five hours. The benzene layer was separated, washed with 200 ml. of 10% sodium hydroxide, dried over magnesium sulfate, and filtered. The yellow solution was then passed through basic alumina and the resulting colorless solution evaporated to dryness. An additional 9.5 grams of white crystalline solid was obtained. Removal of unreacted carboranylacetylene was carried out by washing the combined products with pentane and drying the resulting material in vacuo. A total of 74.5 grams of biscarborane (M.P. 309–310° C.) was obtained, representing a yield of 59% based on carboranylacetylene, or 68% based on BAND. Biscarborane can be readily recrystallized from acetonitrile although no change in melting point of the product is observed.

*Analysis.*—Calculated for $B_{20}H_{26}C_4$: B, 74.45; C, 16.53; H, 9.02. Found: B, 75.30; C, 17:50; H, 8.20.

Example III

*Preparation of diiodobiscarborane.*—To a stirred solution of 7.1 grams (0.025 mole) of biscarborane in 100 ml. of anhydrous tetrahydrofurfuran was added dropwise over a twenty-minute period, under nitrogen, 45 ml. of 1.27 molar tetrahydrofurfuran solution of ethyl magnesium bromide. After stirring for one hour at room temperature, the solution was cooled to 0° C. and a solution of 12.7 grams (0.050 mole) of iodine in 125 ml. of tetrahydrofurfuran was added dropwise until a permanent iodine color persisted (the iodine color was very slow in fading after one-fourth of the solution had been added and approximately three-fourths of the solution was required to produce a permanent iodine color). The solution was allowed to stir overnight. The reaction mixture was poured into water and the ether layer was separated. The aqueous layer was extracted twice with ether and the combined extracts dried over magnesium sulfate, filtered, and the ether removed. The solid residue was dissolved in benzene and passed through a bed of neutral alumina. The resulting slightly brown benzene solution was then evaporated to dryness resulting in diiodobiscarborane, a yellow-brown solid, M.P. 120–135° C. By fractional crystallization, using petroleum ether (B.P. 35–60° C.) yellow needles were obtained, M.P. 183–4° C.

*Analysis.*—Calculated $B_{20}H_{20}C_4I_2$: B, 40.19; C, 8.92; H, 3.74; I, 47.14. Found: B, 39.70; C, 9.13; H, 3.96; I, 46.36.

Example IV

*Preparation of allyl biscarborane.*—To a stirred solution of 5.5 grams (0.0192 mole) of biscarborane in 50 ml. of anhydrous ether was added dropwise, under nitrogen, 50 ml. of 0.77 M butyllithium solution at such a rate as to maintain moderate reflux. The solution was allowed to stir thirty minutes. A solution of 6.0 grams (0.05 mole) of allyl bromide in 20 ml. of anhydrous ether was added and the solution allowed to stir overnight at room temperature.

The yellow-orange reaction mixture was poured into a solution of 25 ml. of concentrated sulfuric acid in 250 ml. of water and the resulting ether layer separated. The aqueous layer was extracted once with ether and the combined extracts were dried over magnesium sulfate, filtered, and evaporated to dryness. Six and five-tenths grams of allyl biscarborane, a whie solid, was obtained. Fractional crystallization from pentane produced 2 grams (32%) of a material of M.P. 124–125° C.

*Analysis.*—Calculated for $B_{20}C_7H_{26}$: B, 66.24; C, 25.73; H, 8.02. Found. B, 63.05; C, 25,49; H, 8.18.

Example V

*Preparation of dimethyl biscarborane.*—To a stirred solution of 5.7 grams (0.02 mole) of biscarborane in 50 ml. of anhydrous ether was added dropwise under nitrogen, 40 ml. of 1.06 M butyllithium solution at such a rate as to maintain reflux. The solution was allowed to stir for thirty minutes at room temperature and then cooled to 0° C. To the solution was added 6.0 grams (0.42 mole) of methyl iodide and it was allowed to stir for one hour, after which it was gradually warmed to room temperature and allowed to stir overnight. The dark orange-brown solution was poured into a solution of 25 ml. of concentrated sulfuric acid in 250 ml. of water. A solid appeared which was redissolved by the addition of benzene. The organic layer was separated and the aqueous layer was extracted once with benzene. The combined extracts were dried over magnesium sulfate, filtered, and evaporated to dryness. Approximately 5.7 grams of dimethyl biscarborane, a white solid, was obtained. Recrystallization from acetonitrile gave needles of M.P. 193–194° C. in approximately 35–40% yield.

*Analysis.*—Calculated for $B_{20}H_{26}C_6$: B, 68.77; C, 22.90; H, 8.33. Found: B, 67.45; C, 22.81; H, 8.83.

Example VI

*Preparation of biscarboranylmethyloxirane.*—To a stirred solution of 0.5 ml. (0.018 mole) of 90% hydrogen peroxide in 30 ml. of methylene chloride, cooled in an ice bath, was added slowly 3 ml. (0.022 mole) of trifluoroacetic anhydride. After stirring for fifteen minutes, this solution was added slowly to a mixture containing 7.66 grams (0.054 mole) of disodium hydrogen phosphate, 3.72 grams (0.01 mole) of allyl biscarborane and 20 ml. of methylene chloride. After the addition was complete, the mixture was refluxed for thirty minutes. The solution was then cooled, filtered and evaporated to dryness. Fractional recrystallization of the resulting solid yielded 1.0 grams (26%) of a crystalline white solid, biscarboranylmethyloxirane, M.P. 173–174° C.

*Analysis.*—Calculated for $B_{20}H_{26}C_7O$: B, 63.15; C, 24.53; H, 7.65. Found: B, 62.23; C, 25.35; H, 7.84.

Example VII

*Preparation of bis(2-hydroxyethyl)biscarborane.*—To a stirred mixture of 10.90 grams of biscarborane in 100 ml. of anhydrous ether, cooled with an ice bath, was added 100 cc. (0.076 mole) of 0.76 M 2-butyllithium solution (in ether). The solution was allowed to warm to room temperature and stirred for fifteen minutes, after which it was again cooled with an ice bath. To this solution was added dropwise 3.8 grams (0.086 mole) of ethylene oxide in 50 cc. of ether. After addition was completed, the reaction mixture was allowed to stir for two hours. The resulting dark solution was hydrolyzed with dilute sulfuric acid and the ether layer separated. The aqueous layer was extracted once with ether and the combined ethereal solutions were dried over magnesium sulfate and evaporated. The resulting viscous residue was dissolved in a minimum of hot methanol and cooled. This afforded 6.3 grams (45% yield) of a crystalline material, bis(2-hydroxyethyl)biscarborane, M.P. 160–162° C. Recrystallization from acetonitrile yielded a material of M.P. 163–164° C.

*Analysis.*—Calculated for $B_{20}C_8H_{30}O_2$: B, 57.74; C, 25.64; H, 8.07. Found: B, 57.17; C, 26.00; H, 8.04.

Example VIII

*Preparation of diethyl biscarboranyl dicarboxylate.*—To a stirred solution of 34.3 grams (0.12 mole) of biscarborane in 300 ml. of anhydrous diethyl ether at 0° C. was added, dropwise, under nitrogen, over a fifteen minute period, 300 ml. (0.24 mole) of 0.8 M n-butyllithium solution (in ether). After stirring for approximately fifteen minutes, the solution was transferred to a dropping funnel and added dropwise, under nitrogen, to a stirred solution of 27.0 grams (0.25 mole) of ethyl chloroformate in 300 ml. of ether at 0° C. The addition was carried out over a forty-five minute period after which the resulting blood red solution was warmed to room temperature and allowed to stir overnight.

The reaction mixture was poured into 750 ml. of chilled 1.5 N sulfuric acid. After shaking vigorously until most of the color disappeared, the ether layer was separated and the resulting aqueous layer extracted twice with additional ether. The combined extracts were dried over magnesium sulfate, filtered and stripped. Approximately 48.0 grams of a pale green solid was obtained. Crystallization from hexane afforded 32 grams of crystalline material, diethyl biscarboranyl dicarboxylate, M.P. 146–152° C. Further recrystallization from hexane gave approximately 26 grams of the pure ester of M.P. 152–153° C. representing a 50% yield based on biscarborane.

*Analysis.*—Calculated for $B_{20}C_{10}H_{30}O_4$: B, 50.24; C, 27.88; H, 7.02. Found: B, 50.24; C, 27.79; H, 7.02.

Example IX

*The reduction of diethyl biscarboranyl dicarboxylate (preparation of biscarboranyl methanol).*—To a stirred solution of 1.0 gram (0.026 mole) of lithium aluminum hydride in 75 ml. of anhydrous ether, at room temperature, was added a solution of 5.0 grams (0.012 mole) of diethyl biscarboranyl dicarboxylate in 125 ml. of ether at such a rate so as to maintain moderate reflux. After the addition, refluxing was continued for one and one-half hours. The blood red reaction mixture was cooled to room temperature and methanol was added until reaction ceased. The reaction mixture was poured into 250 ml. of 1.5 N sulfuric acid and the ether layer separated. The resulting aqueous portion was extracted twice with ether. The combined ether extracts were dried over magnesium sulfate, filtered and stripped. 2.6 grams of a white solid was obtained. This was dissolved in hexane and the solution passed through a silica gel column. The column was eluted with approximately one liter of hexane. The hexane was stripped off producing 1.2 grams of biscarborane. The column was then eluted with approximately one liter of benzene. The resulting solution was stripped producing 1.4 grams of a white solid. Crystallization from hexane afforded 1.15 grams of a crystalline white solid, biscarboranyl methanol, M.P. 163–164° C., representing a 30% yield based on the diester. Further recrystallization raised the melting point at 165–166° C.

*Analysis.*—Calculated for $B_{20}C_5H_{24}O$: B, 68.34; C, 18.96; H, 7.64. Found: B, 69.55; C, 18.41; H, 7.69.

Example X

Using the method set forth in Example III, an equimolar quantity of $Br_2$ was substituted for the $I_2$. Dibromobiscarborane was readily isolated from the reaction mixture.

Example XI

Using the method employed in Example V, an equimolar quantity of butyl iodide was substituted for the methyl iodide. Dibutyl biscarborane was isolated in good yield.

We claim:
1. Compounds selected from the group consisting of (a) compounds of the formula

R—⊖—⊖—R in which R is selected from the group consisting of halogen, lower alkyl, hydroxyethyl and carbethoxy, in which the R's are the same in any one product and —⊖— is the radical —$C_2B_{10}H_{10}$— and (b) compounds of the general formula

H—⊖—⊖—R¹ in which R¹ is selected from the group consisting of $CH_2=CH-CH_2-$, —$CH_2OH$ and

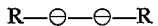

and —⊖— is as set forth hereinbefore.

2. Bis(2-hydroxyethyl)biscarborane of the formula $HOCH_2CH_2$—⊖—⊖—$CH_2CH_2OH$, and —⊖— is the radical —$CH_2H_{10}B_{10}$—.

3. Allylbiscarborane of the formula

H—⊖—⊖—$CH_2$—CH=$CH_2$ and —⊖— is the radical —$C_2H_{10}B_{10}$—.

4. Biscarboranylmethyl oxirane of the formula

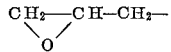

and —⊖— is the radical —$C_2H_{10}B_{10}$—.

5. Diethyl biscarboranyl dicarboxylate of the formula $_5H_2C$—OOC—⊖—⊖—$COOC_2H_5$, and —⊖— is the radical —$C_2H_{10}B_{10}$—

6. Biscarboranyl methanol of the formula $$H\text{—}\ominus\text{—}\ominus\text{—}CH_2OH$$

and —$\ominus$— is the radical —$C_2H_{10}B_{10}$—.

7. A process for the preparation of derivatives of biscarborane which comprises reacting in an inert anhydrous atmosphere biscarborane in ether solution with at least two moles of a hydrocarbon lithium compound in which the hydrocarbon radical is selected from the group consisting of methyl, ethyl, butyl, phenyl and tolyl, thus, forming the dilithium biscarborane, reacting the dilithium biscarborane in an inert anhydrous atmosphere with a compound selected from the group consisting of halogens, alkyl halides, ethylene oxide, allyl bromide, and ethyl formate and isolating the biscarborane derivative so formed.

No references cited.

WALTER A. MODANCE, *Primary Examiner.*

L. D. ROSDOL, CARL D. QUARFORTH, *Examiners.*